United States Patent [19]

Kaufman et al.

[11] Patent Number: 5,328,159

[45] Date of Patent: Jul. 12, 1994

[54] AXLE HOUSING ATTACHMENT ASSEMBLY

[75] Inventors: Ted J. Kaufman, Ossian; David G. Moses, Decatur, both of Ind.; Edward E. Stuart, Payne, Ohio

[73] Assignee: Dana Corporation, Toledo, Ohio

[21] Appl. No.: 931,916

[22] Filed: Aug. 18, 1992

[51] Int. Cl.$^5$ .............................................. B60G 11/10
[52] U.S. Cl. ..................... 267/52; 280/712; 280/718
[58] Field of Search ................ 267/52, 260; 280/712, 280/713, 718, 725; 180/905

[56] References Cited

U.S. PATENT DOCUMENTS

| | | | |
|---|---|---|---|
| 379,839 | 3/1888 | White | 267/52 |
| 427,357 | 5/1890 | Peck | 267/52 |
| 1,283,803 | 11/1918 | Kirkham | 267/52 |
| 1,292,611 | 1/1919 | Jones | 280/688 |
| 1,314,817 | 9/1919 | Laycock | 280/688 |
| 1,539,070 | 5/1925 | Brown | 280/688 |
| 1,575,118 | 3/1926 | Lipcot | 267/52 |
| 1,899,913 | 2/1933 | McCuen | 267/52 |
| 2,280,347 | 4/1942 | Olley et al. | 267/52 |
| 2,745,661 | 5/1956 | Van Raden | 267/52 |
| 2,754,111 | 7/1956 | Norrie | 267/52 X |
| 2,907,579 | 10/1959 | Masser | 280/686 |
| 2,913,252 | 11/1959 | Norrie | 280/683 |
| 3,022,087 | 2/1962 | Black | 280/688 |
| 3,140,880 | 7/1964 | Masser | 280/683 |
| 3,154,321 | 10/1964 | McLean | 267/256 |
| 3,237,957 | 3/1966 | Harbers | 280/6 |
| 3,332,701 | 7/1967 | Masser | 280/688 |
| 3,356,385 | 12/1967 | Small | 280/104.5 |
| 3,386,724 | 6/1968 | Tantlinger et al. | 267/52 |
| 3,406,983 | 10/1968 | Masser | 280/688 |
| 3,437,333 | 4/1969 | Koch et al. | 267/52 |
| 3,494,609 | 2/1970 | Habers, Jr. | 267/52 |
| 3,547,215 | 12/1970 | Bird | 280/688 |
| 3,580,347 | 5/1971 | McGee | 180/22 |
| 3,598,387 | 8/1971 | Webster, Jr. | 267/54 |
| 3,630,541 | 12/1971 | Carlson et al. | 267/52 |
| 3,653,683 | 4/1972 | Hendrickson | 280/688 |
| 3,707,298 | 12/1972 | Henry et al. | 267/256 |
| 3,749,196 | 7/1973 | Traylor | 267/52 |
| 3,773,347 | 11/1973 | Traylor | 267/52 |
| 3,801,086 | 4/1974 | Raidel | 267/67 |
| 3,913,937 | 10/1975 | Longworth et al. | 267/52 |
| 3,935,915 | 2/1976 | Seilly et al. | 267/52 |
| 3,961,826 | 6/1976 | Sweet et al. | 280/702 |
| 4,033,606 | 7/1977 | Ward et al. | 280/682 |
| 4,061,361 | 12/1977 | Felburn | 280/681 |
| 4,131,297 | 12/1978 | Raidel | 280/682 |
| 4,162,090 | 7/1979 | Schwartz | 280/688 |
| 4,227,716 | 10/1980 | Nordstrom | 280/719 |
| 4,322,061 | 3/1982 | Masser | 267/52 X |
| 4,383,703 | 5/1983 | Honda et al. | 280/682 |
| 4,415,179 | 11/1983 | Marinelli | 280/683 |
| 4,422,667 | 12/1983 | Perry | 280/705 |
| 4,427,213 | 1/1984 | Raidel, Jr. | 280/711 |
| 4,465,298 | 8/1984 | Raidel, Sr. | 280/711 |
| 4,693,486 | 9/1987 | Pierce et al. | 280/713 |
| 4,756,550 | 7/1988 | Raidel | 280/713 |
| 4,759,567 | 7/1988 | Allen | 280/713 |
| 4,858,949 | 8/1989 | Wallace et al. | 280/713 |
| 4,900,057 | 2/1990 | Raidel | 280/713 |
| 4,946,190 | 8/1990 | Buttner | 280/712 |

Primary Examiner—Richard M. Camby
Assistant Examiner—Peter English
Attorney, Agent, or Firm—Dykema Gossett PLLC

[57] ABSTRACT

A mounting assembly for securing an axle housing to the suspension system of a vehicle frame includes an upper bracket and a lower bracket which partially enclose an axle housing. The upper bracket and the lower bracket are clamped together and have engageable contacting surfaces to provide vertical and torque support for the axle housing walls. Rubber couplings are disposed between the axle housing and the brackets to prevent wearing of the metal surfaces.

10 Claims, 3 Drawing Sheets

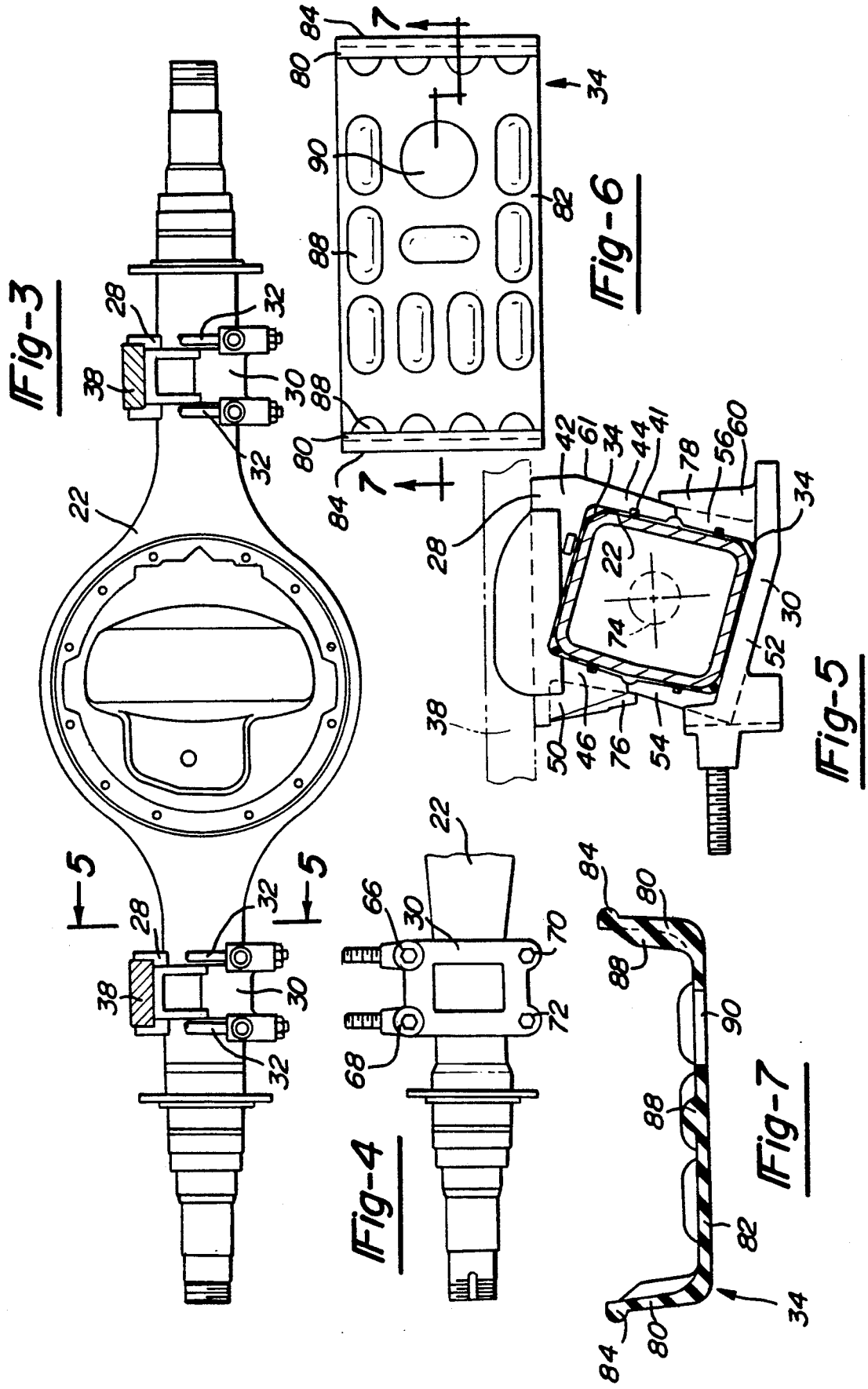

AXLE HOUSING ATTACHMENT ASSEMBLY

BACKGROUND OF THE INVENTION

This invention relates generally to structure for securing an axle housing to a suspension system of a vehicle.

Wheel bearing axles are typically secured to a suspension system on the underside of a vehicle frame. One bracket assembly known in the prior art comprises of an upper bracket component, a lower bracket component, and a clamping means. The bracket components are spaced from each other, and connected only through the clamping means which tighten the bracket components around the axle housing. This type of bracket assembly must rely on the axle housing to provide vertical support as the bracket components are clamped together.

Strength requirements of the axle housing walls increase where torque is also applied. In one typical mount location for the axle housing, the upper bracket secures the upper portion of the axle housing to a vertical suspension system, and the lower bracket secures the lower portion of the axle housing to a horizontal suspension system. The combination of the vertical and horizontal forces applies torque to the axle housing. The prior art brackets do not relieve this torque, and axle housings often fatigue, bend, or crack over time.

Wearing of surface metal occurs on the axle housing in prior art bracket arrangements at the contact area between the axle housing and bracket components. As demands for strength and longer life of the axle housing increase, the deficiencies in the prior art become more undesirable.

SUMMARY OF THE INVENTION

The present invention discloses improvements in the mounting assembly utilized in securing a wheel bearing axle housing to the suspension system on the underside of a vehicle frame. Upper and lower brackets of the mounting assembly are connected to components of the suspension system and are provided with engageable contacting surfaces to provide a rigid structure around the axle housing throughout 360°. The wearing of surface metal is essentially eliminated by placing and utilizing flexible couplings between the brackets and the axle housing.

Both vertical loads and torque applied to the walls of the axle housing are transferred to the mounting assembly. The upper bracket includes a base and side walls extending outwardly from the base to form a channel. Similarly, the lower bracket includes a base and side walls extending outwardly from the base to form a channel. The axle housing is received within the channels formed by the engageable brackets. Vertical loads resulting from clamping the brackets together are transferred from the axle housing to the side walls of each bracket.

Torque occurs when the suspension system of a vehicle forces an upper or lower portion of the axle housing laterally about the longitudinal axis defined by the axle. The side walls of the brackets include engageable contacting surfaces to prevent such lateral movement. The mounting assembly is thus designed to absorb the torque, and prevent the torque from damaging the axle housing.

Metal-to-metal contact between the axle housing and the bracket is eliminated by use of flexible couplings. The flexible couplings are formed of rubber, and are inserted into both the upper and lower bracket prior to assembly.

These and other features of the present invention can best be understood from the following specification and drawings, of which the following is a brief description.

BRIEF DESCRIPTION OF THE DRAWINGS

FIG. 3 is a side view of an axle housing and mounting assembly.

FIG. 4 is a fragmentary bottom view of the axle housing and mounting assembly.

FIG. 5 is a cross-sectional view along line 5—5 of FIG. 3.

FIG. 6 is a plan view of the channel of a flexible coupling.

FIG. 7 is a cross-sectional view along line 7—7 of FIG. 6.

DETAILED DESCRIPTION OF THE PREFERRED EMBODIMENT

Figure 1:
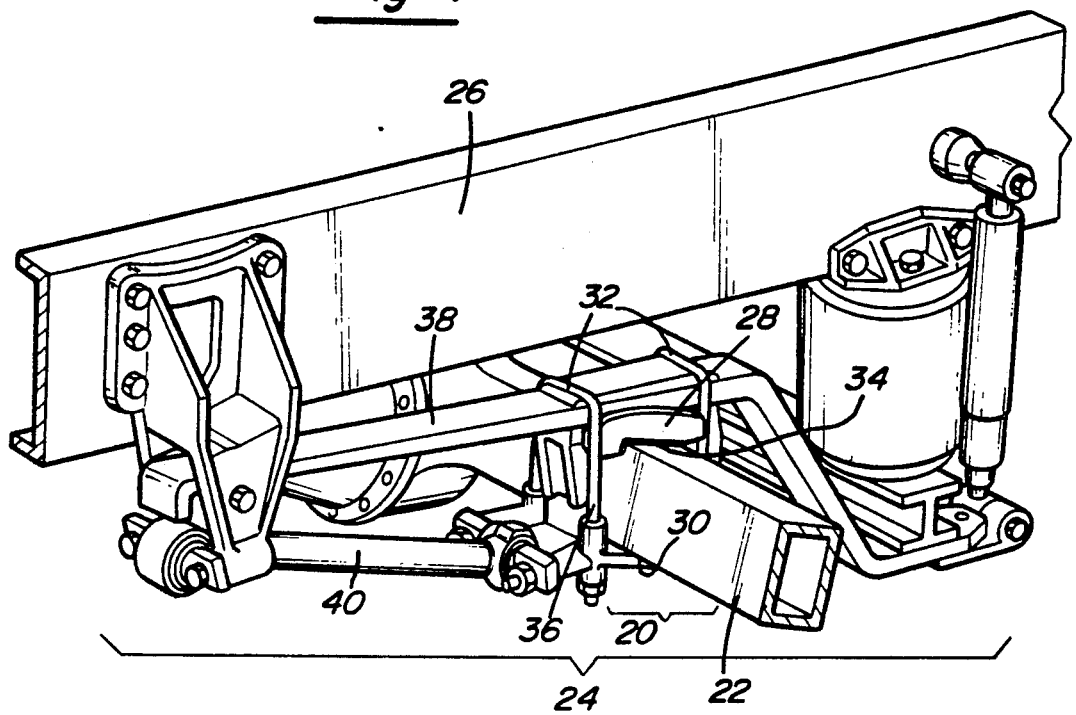
FIG. 1 is a perspective view of an axle housing secured to a suspension system incorporating the inventive mounting assembly.

Referring now to FIG. 1, an inventive mounting assembly 20 secures an axle housing 22 to a suspension system 24 of a vehicle frame 26. The mounting assembly 20 provides support for the walls of the axle housing 22, and includes an upper bracket 28, a lower bracket 30, U-bolts 32 and flexible couplings 34. The U-bolt includes two shaft members 36. The upper bracket 28 attaches the axle housing 22 to a tapered leaf spring 38, and the lower bracket 30 attaches the axle housing 22 to a torque support rod 40. The upper bracket 28 and lower bracket 30 extend 360° around a portion of the axle housing 22, and contact each other when clamped together to form a rigid structure.

With conventional bracket components, vertical clamp loads on the axle housing 22 result as the brackets are tightened by a clamp. Torque on the axle housing 22 results from the torque support rod 40, attached to lower bracket 30. When the brackets are spaced from each other, as with conventional brackets, the vertical clamp load and torque are applied directly to the axle housing 22. With the inventive mounting assembly, vertical loads and torque are instead transferred to the mounting assembly 20 through the upper bracket 28 and lower bracket 30.

Figure 2:
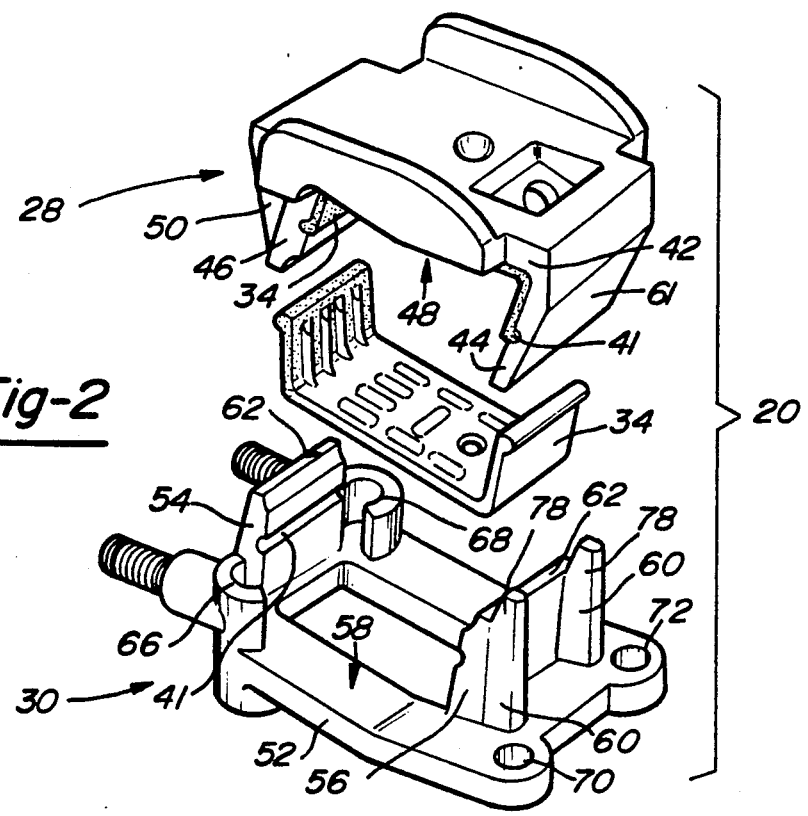
FIG. 2 is an exploded view of the mounting assembly.

In FIG. 2, a pair of non-metal flexible couplings 34 are placed in the brackets to prevent metal contact between the axle housing 22 and the brackets. Each bracket 28 and 30 includes a pair of recesses 41 to aid in inserting the flexible coupling 34.

The upper bracket 28 comprises a base 42, first side wall 44 and a second side wall 46 defining a channel 48. The second side wall includes stabilizing footers 50. Stabilizing footers 50 are structural members which are integrally connected to second side wall 46 and which extend outwardly away from base 42 beyond the second side wall 46. The lower bracket 30 includes a base 52, third side wall 54 and a fourth side wall 56 defining a channel 58. The fourth side wall 56 includes stabilizing footers 60, similar to stabilizing footers 50 previously discussed. In a manner similar to stabilizing footers 50, stabilizing footers 60 extend outwardly from base 52 to contact an exterior surface 61 of opposing first side wall 44 when brackets 28 and 30 are clamped together.

Each side wall includes a ledge 62 at a position spaced furthest away from the bases of upper bracket 28 and lower bracket 30. By extending to contact an exterior surface of the opposing bracket, stabilizing footers 50 and 60 prevent lateral sliding of the brackets with respect to the axle housing 22, which extends along a longitudinal axis. Each side wall further includes a longitudinally extending recess 41 to maintain the flexible coupling 34 in position during assembly, as will be discussed in greater detail below.

Referring to FIGS. 3-5, in order to clamp upper bracket 28 and lower bracket 30 together around the axle housing, a first U-bolt 32 extends through apertures 66 and 68 and a second U-bolt 32 extends through apertures 70 and 72. The ledges 62 are generally perpendicular to the U-bolt shaft 36 to provide a flat surface when clamping the brackets. Preferably, ledges 62 are machined such that the brackets fit together to enclose the axle housing 22 within close tolerances. The vehicle axle 74 is shown schematically in FIG. 5. The vehicle axle 74 extends longitudinally within the axle housing 22.

When the brackets are clamped together, the ledge 62 of the first side wall 44 on upper bracket 28 contacts the ledge 62 of the corresponding fourth side wall 56 on lower bracket 30. Similarly, ledge 62 on second side wall 46 of upper bracket 28 contacts the ledge 62 of the corresponding third side wall 54 on lower bracket 30. Stabilizing footers 50, which are integral to the second side wall 46, include an outer edge portion 76 that extends outwardly beyond ledge 62 of the second side wall 46 to contact the exterior surface of the third side wall 54. Similarly, stabilizing footers 60, which are integral to the fourth side wall 56, include an outer edge portion 78 that extends outwardly beyond ledge 62 of the fourth wall 56 to contact the exterior surface of the first side wall 44. This interlocking structure assists brackets 28 and 30 in bearing the torques described above. Alternative embodiments of the bracket structure, described below, also assist in bearing these torques.

Flexible couplings 34 are placed within channels 48 and 58 around a portion of axle housing 22. The flexible couplings 34 are formed of rubber and eliminate metal-to-metal contact between axle housing 22 and brackets 28 and 30. This eliminates the wearing of surface metal on the axle housing 22 found in the prior art.

The flexible coupling 34 of FIGS. 6 and 7 is in the form of a U-shaped channel with flanges 80 extending outwardly from seat 82. A bead 84 extends outwardly away from the channel along an outer portion of each flange 80. The flexible coupling 34 includes protrusions 88 and an aperture 90. Protrusions 88 and aperture 90 allow the flexible coupling 34 to deform around the axle housing 22. This permits the brackets to be tightly clamped in the assembled position and to accommodate manufacturing tolerances.

The flexible coupling 34 is dimensioned and shaped to be placed in channels 48 and 58 of the upper and lower bracket 28 and 30, respectively, as shown in FIG. 2. When placing the flexible coupling 34 within channels 48 and 58, each bead 84 is inserted into the corresponding recess 41. The flanges 80 are angled slightly outwardly, being biased towards the side walls of each bracket.

Figure 8:
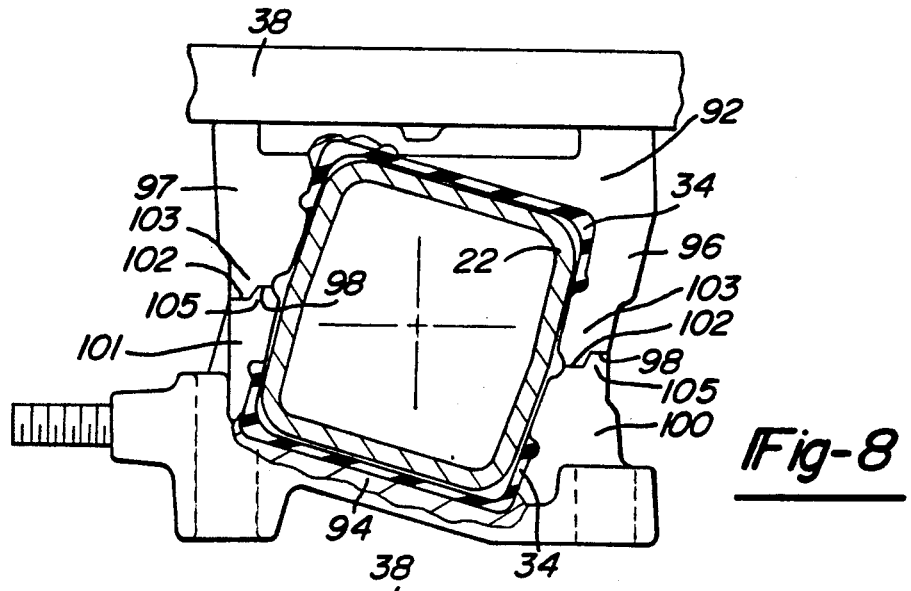
FIG. 8 is a cross-sectional view similar to FIG. 5, but showing a second embodiment of the mounting assembly.

In FIG. 8, a second embodiment of the mounting assembly 20 includes an upper bracket 92 and a lower bracket 94. Each side wall 96 and 97 of the upper bracket 92 includes a notch 98 extending along the surface contacting lower bracket 94. Similarly, each side wall 100 and 101 of lower bracket 94 includes a notch 102 extending along the surface contacting upper bracket 92. A portion 103 of upper bracket 92 is received within notch 102 of the lower bracket, and a portion 105 of the lower bracket 94 is received within notch 98 of upper bracket 92. Notches 98 and 102 and portions 103 and 105 provide engageable contacting surfaces between brackets 92 and 94 to prevent lateral movement with respect to the longitudinal axis defined by the axle housing 22.

Figure 9:
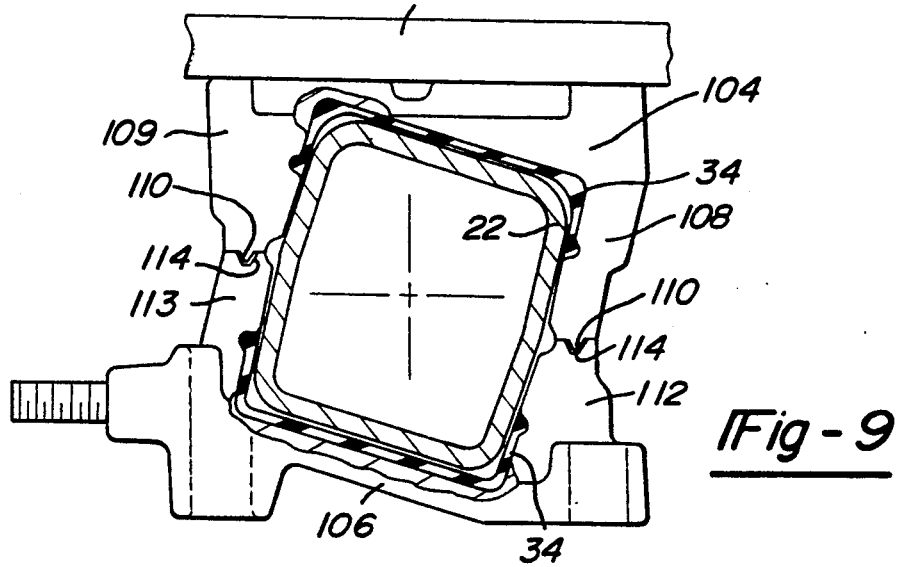
FIG. 9 is a cross-sectional view similar to FIG. 5, but showing a third embodiment of the mounting assembly.

In FIG. 9, a third embodiment of mounting assembly 20 includes an upper bracket 104 and a lower bracket 106. Each side wall 108 and 109 of upper bracket 104 includes a V-shaped rib 110, and each side wall 112 and 113 of lower bracket 106 includes a corresponding groove 114, receiving a V-shaped rib 110. The upper bracket 104 and lower bracket 106 thus have engaged surfaces to prevent lateral movement with respect to the longitudinal axis defined by the axle housing 22.

Figure 10:
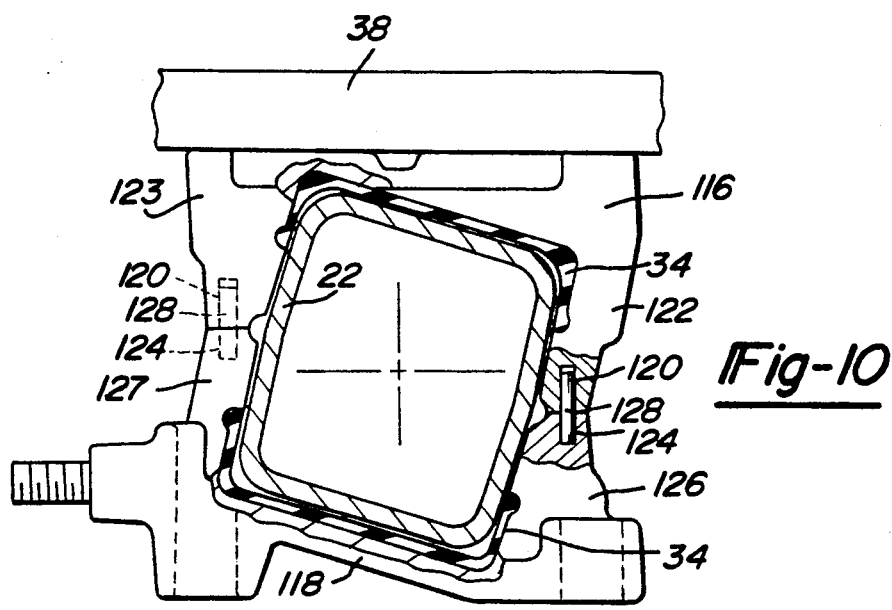
FIG. 10 is a cross-sectional view similar to FIG. 5, but showing a fourth embodiment of the mounting assembly.

In FIG. 10, a fourth embodiment of mounting assembly 20 includes an upper bracket 116 and a lower bracket 118. Upper bracket 116 includes an aperture 120 on each side wall 122 and 123 along the surface area contacting the lower bracket 118. Similarly, the lower bracket 118 includes an aperture 124 on each side wall 126 and 127 which is aligned with each aperture 120 of upper bracket 116. A pin 128 is received within the apertures 120 and 124 to prevent lateral movement of brackets 116 and 118 with respect to the longitudinal axis defined by the axle housing 22.

In one form of the first embodiment of the present invention, upper bracket 28 and lower bracket 30 are formed of ductile iron and the flexible couplings 34 are formed of natural rubber. The base and side walls of the upper bracket 28 and lower bracket 30 are approximately 0.70 inch (17.8 mm) thick in cross-section. The flexible couplings 34 are approximately 0.14 inch (3.6 mm) thick in cross-section at most areas, and are 0.35 inch (8.9 mm) thick in cross-section at the protrusions.

Preferred embodiments of the present invention have been disclosed. A worker of ordinary skill in the art, however, would recognize that certain modifications would come within the scope of this invention. For that reason, the following claims should be studied in order to determine the true scope and content of this invention.

What is claimed is:

1. A mounting assembly for securing an axle housing to a suspension on a vehicle frame, said axle housing extending along a longitudinal axis, said mounting assembly comprising:

an upper bracket and a lower bracket spaced about the longitudinal axis, said upper bracket having a base, a first side wall, and a second side wall laterally spaced from said first side wall, said first side wall and said second side wall extending outwardly away from said base and forming a channel, said lower bracket having a base, a third side wall, and a fourth side wall laterally spaced from said third side wall, said third side wall and said fourth side wall extending outwardly away from said base and forming a channel, each said side walls having a ledge at the outermost portion away from each said base;

clamping means for tightening said upper and lower brackets around the axle housing; and non-metal flexible couplings disposed in said upper and lower brackets, each said side wall of each said channel including a longitudinally extending recess, a portion of each said coupling being inserted into a respective said recess to maintain said coupling therein during assembly, said portion of each said coupling maintaining each said coupling within a respective said bracket prior to contact of said coupling with said axle housing.

2. The mounting assembly as recited in claim 1, wherein each said flexible coupling is formed of natural rubber.

3. The mounting assembly as recited in claim 1, wherein each said flexible coupling includes a seat extending parallel to the longitudinal axis, and flanges laterally spaced away from said longitudinal axis and extending outwardly from said seat to form a channel, said flexible couplings being dimensioned and shaped to conform and thereby fit within the channels of said brackets.

4. The mounting assembly as recited in claim 3, wherein said flanges are angled outwardly from said seat of said coupling, said flanges being adapted to be biased against the side walls of said brackets.

5. The mounting assembly as recited in claim 1, wherein each said coupling is formed of a compressible material.

6. The mounting assembly as recited in claim 5, wherein each said flexible couplings include an aperture, said aperture providing a space for deformation of said flexible coupling when said coupling is being compressed.

7. The mounting assembly as recited in claim 6, wherein each said flexible couplings include a plurality of protrusions, said protrusions providing a space for deformation of said coupling when said coupling is being compressed.

8. The mounting assembly as recited in claim 1, wherein one of said brackets include an integral extension contacting an exterior surface of the other of said brackets, said integral extension adapted to provide lateral support to the axle housing relative to the longitudinal axis.

9. The mounting assembly as recited in claim 1, wherein one of said upper and lower brackets includes a notch extending along the ledge of said brackets, and the other of said brackets includes a corresponding portion adapted to extend within said notch to provide lateral support to the axle housing relative to the longitudinal axis.

10. The mounting assembly as recited in claim 1, wherein said corresponding side walls of said upper and lower brackets have aligning apertures, at least one set of said aligning apertures being on each lateral side of said axle housing, a pin extending through each set of said aligning apertures, said pins preventing lateral movement of said upper and lower brackets relative to said longitudinal axis.

* * * * *